United States Patent [19]

Helms et al.

[11] Patent Number: 4,689,183
[45] Date of Patent: Aug. 25, 1987

[54] ULTRA LOW FLOW RATE LIQUID REDISTRIBUTOR ASSEMBLY FOR USE IN A LIQUID-VAPOR CONTACT TOWER

[75] Inventors: Roger L. Helms, Gales Ferry, Conn.; Stephen M. Harper, Lake Jackson, Tex.

[73] Assignee: The Dow Chemical Company, Midland, Mich.

[21] Appl. No.: 803,188

[22] Filed: Dec. 2, 1985

[51] Int. Cl.⁴ .............................................. B01F 3/04
[52] U.S. Cl. ...................................................... 261/97
[58] Field of Search .................................... 261/97, 98

[56] References Cited

U.S. PATENT DOCUMENTS

| | | | |
|---|---|---|---|
| 3,232,590 | 2/1966 | Eckert | 261/97 |
| 3,281,133 | 10/1966 | Eckert | 261/97 |
| 3,290,024 | 12/1966 | Huber | 261/97 |
| 3,360,246 | 12/1967 | Eckert | 261/98 |
| 4,432,913 | 2/1984 | Harper et al. | 261/97 |
| 4,444,696 | 4/1984 | Harper et al. | 261/97 |
| 4,476,069 | 10/1984 | Harper et al. | 261/97 |
| 4,557,877 | 12/1985 | Hofstedder | 261/97 |

FOREIGN PATENT DOCUMENTS

1113680  9/1961  Fed. Rep. of Germany ........ 261/97
55-159804 12/1980  Japan ..................................... 261/97

Primary Examiner—Tim Miles

[57] ABSTRACT

A redistributor assembly for a liquid-vapor contact tower including a liquid collecting apparatus, a ladder-type liquid redistributor disposed beneath the collecting apparatus, and at least one conduit in fluid communication connecting the collecting apparatus and the ladder-type redistributor. The assembly is capable of uniformly redistributing liquid within the liquid-vapor contact tower at ultra-low flow rates by impressing a high pressure on the liquid at the point where the liquid is just about to enter the assembly's redistribution outlets. The collecting apparatus is disposed sufficiently far above the ladder-type redistributor to provide the level of liquid in the conduit that produces the desired pressure head on the liquid within the ladder-type redistributor. As the liquid pressure varies with the height of the liquid in the conduit, the total flow rate of the liquid from the ladder-type redistributor varies proportionally to just match the flow rate of liquid being collected by the collecting apparatus. Plugging of the assembly's outlets by debris in the liquid entering the assembly is prevented while still redistributing the liquid.

8 Claims, 12 Drawing Figures

FIG. 12

ULTRA LOW FLOW RATE LIQUID REDISTRIBUTOR ASSEMBLY FOR USE IN A LIQUID-VAPOR CONTACT TOWER

BACKGROUND OF THE INVENTION

Field of the Invention

This invention is an appratus for collecting and uniformly distributing a downflowing liquid in a liquid-vapor contact tower while allowing easy (low pressure-drop) passage of the vapors in the tower through the apparatus. The invention is related to a field of art commonly referred to as liquid redistributors. Such redistributors find wide usage in process towers in the chemical and petrochemical industries wherein it is desired to obtain intimate mixing of vapors and liquids within them.

Ordinarily the vapors in such towers rise while the liquid is falling, but in some instances both the vapor and liquid flow downwardly. This invention is applicable to both situations.

Also, such redistributors are normally used in vapor-liquid contact towers which contain beds of column packing. Usually a redistributor is placed beneath a bed of such column packing in a tower in order to collect the liquid flowing downwardly through this bed and then redistribute the liquid in a uniform manner across a second bed of column packing located beneath the redistributor. This is done because it is well known that liquid becomes maldistributed as it descends through such beds due to such phenomena as channeling in the bed and adherence of the liquid to the sides of the tower walls. Such maldistribution results in the loss of the desired intimate, uniform mixing of vapor and liquid as the liquid descends downwardly in the bed. To offset this maldistribution, redistributors are placed at strategic levels within the vapor-liquid mixing zone in the tower.

Probably the most difficult problem encountered in designing, fabricating, installing, and operating such liquid redistributors is that of managing liquid flowing downwardly in the tower at very low liquid flow rates. Normally, liquid flow rates are usually from about 2.0 to about 10.0 gallons per minute per square foot of tower horizontal cross-sectional area. It is at flow rates less than about 2.0 gallons per minute per square foot that problems arise in distributing the liquid. The important aspect of any column packing in any system is to keep all the packing at least moist so as to avoid "dry or hot spots" in the packing which the vapor contacts. It would seem that at low liquid flow rates this purpose would be best achieved by increasing the number of liquid distribution points per square foot of tower horizontal cross-section, or it would appear to do so at first blush by those not skilled in the art. However, more distribution points in turn would require even a smaller liquid flow rate through each distribution point. And smaller flow rates would mean smaller openings in the distribution points. To those skilled in the art a problem is present when one goes to smaller diameter distribution points. This problem is a plugging problem of the distribution points caused by solid particles or flecks of debris present in the liquid. These flecks tend to plug up small-diameter distribution points.

Of course, such plugging results in the redistributor doing exactly the opposite of what it is supposed to do; i.e., keeping the liquid evenly distributed across the top of the bed of column packing located immediately beneath the redistributor.

The ladder-type liquid distributor (not redistributor) disclosed in U.S. Pat. No. 4,444,696 solves this problem for distributing liquid which is collected outside the tower and then fed into the tower through the distributor. It provides distribution points whose inlet cannot be plugged by debris, and it employs a larger pressure head on the liquid to be distributed. This pressure head greatly alleviates distortion in the uniformity of the liquid distribution. This distortion in liquid distribution is ordinarily present due to undesired, but present, non-uniformity in the level of all of the distribution point inlets.

But, of course, the distributor disclosed in this patent is not a redistributor, i.e., it is not designed to collect liquid falling from above and U.S. No. 4,444,696, is incorporated by reference as if set forth at length.

A redistributor which overcomes the plugging problem is disclosed in U.S. Pat. 4,432,913, which is also incorporated by reference. However, this redistributor does not provide a way for employing a large head pressure on the distribution point inlets to improve the uniformity of liquid distribution.

It would be advantageous to have a liquid redistributor which not only overcomes the debris plugging problem, but also provided a means for producing a large pressure head on the liquid being redistributed.

STATEMENT OF THE INVENTION

The present invention achieves both of these advantages while simultaneously being capable of distributing liquid very uniformly at ultra-low flow rates; e.g., liquid flow rates less than 0.2 gallon per square foot of tower horizontal cross-section per minute. In one of its alternate embodiments, the present invention also provides an overflow means for uniformly distributing liquid overflow when the liquid collected by the redistributor is collected at a rate which is too great to be distributed solely by the redistributor's primary distribution points.

The present invention is a liquid redistributor assembly for use in a liquid-vapor contact tower wherein it is desired to collect liquid falling from a bed of column packing positioned above the liquid redistributor assembly in the tower and then redistribute the liquid in as uniform a pattern as possible across an imaginary horizontal cross-section of the tower's interior located immediately under the liquid redistributor assembly. The invention is comprised of three major elements. These elements and their sub-elements are described in spatial orientation terms as they would be present in an operational configuration in a liquid-vapor contact tower. That is, modifying spatial orientation adjectives such as vertical and horizontal appIly to the invention as it would be used, but not necessarily as it would be fabricated or stored.

The three major elements of which the liquid redistributor assembly is comprised are: (A) a liquid collecting apparatus; (B) a ladder-type liquid distributor disposed beneath the liquid collecting apparatus; and (C) at least one feed conduit which connects the liquid collecting apparatus in fluid communication with the ladder-type liquid distributor. The feed conduit also provides a liquid head of pressure under which the liquid in the ladder-type liquid distributor to be maintained when the liquid redistributor assembly is being utilized in an operational liquid-vapor contact tower. The liquid collecting apparatus element and the ladder-type liquid distributor element are comprised of several sub-elements.

A. Liquid Collecting Apparatus

The liquid collecting apparatus element is comprised of: (1) a horizontal plate, (2) an upstanding flange, (3) a plurality of vertically oriented ducts, (4) at least one liquid collection reservoir, and (5) a roofing means disposed over each of the ducts.

The horizontal plate is designed so that, preferably, it extends across an entire horizontal cross-section of the tower in which it is to be employed. The plate has a plurality of spaced openings in it to allow vapor to pass through it.

The vertically oriented ducts are sealably affixed in the spaced openings of the plate with the duct sides extending upwardly above the plate. The upstanding flange is sealably attached to the periphery of the horizontal plate. It also extends above this horizontal or bottom plate.

The liquid collection reservoir is located immediately above the horizontal plate and is defined as that space which is located above the plate and between the exterior of the duct walls and the interior of the upstanding flange. The purpose of this reservoir is to collect a liquid falling in the tower from above the liquid redistributor assembly. A roofing means is provided over the top of each duct to prevent liquid from falling directly through the ducts.

The roofing means are formed so as to shunt all liquid falling on top of them to flow into the reservoir. The roofing means are also spaced far enough above the top of the duct walls so as to allow easy, low pressure drop, passage of vapor directly through the ducts. The roofing means is thus made so that the falling liquid has to pass into the reservoir while allowing gas or vapor to flow through the liquid collecting apparatus without passing through the reservoir.

From the reservoir the liquid flows into and down the feed conduit, or conduits, into the ladder-type liquid distributor to which it, or they, are sealably connected. The feed conduit, or conduits, are sized in diameter sufficiently large for the liquid flow that is to flow through it, or them, so that there will occur no appreciable pressure drop in the liquid when the liquid does flow through it, or them.

B. Ladder-Type Liquid Distributor

The ladder-type liquid distributor is comprised of: (1) an array of spaced apart, substantially parallelly disposed, hollow, liquid distributor tubes; (2) hollow transfer lines which structurally connect and structurally support adjacent liquid distributor tubes, and which also provide liquid communication between the liquid distributor tubes and the liquid feed conduit, or conduits; and (3) a plurality of substantially parallel, substantially vertical, spaced apart, hollow pipelets sealably inserted through the bottom of said distributor tubes.

The array of hollow, liquid distributor tubes is enclosed except for openings provided in them for connecting them to each other through the hollow transfer lines, holes provided in them for inserting the hollow pipelets, and any holes provided in the top of any of them by which to connect the ladder-type distributor to the liquid conduit, or conduits, if so desired. Note the ladder-type distributor may be connected to the conduit through the transfer lines as easily as through the distributor tubes. The pipelets, transfer lines and feed condiut(s) are sealably connected to their respective openings in such a manner so that the distributor tubes and transfer lines are disposed horizontally across a horizontal section of the tower and the pipelets extend vertically downwardly from the bottoms of the distributor tubes in a uniformly spaced apart pattern. The pipelets, distributor tubes, transfer lines, openings, and feed conduits are connected together in a manner such that liquid will flow downwardly from the liquid collecting apparatus through the feed conduit, or conduits, into the ladder-type distributor and such that within the ladder-type distributor the liquid will flow through the transfer lines into the distributor tubes and on out of the ladder-type distributor through the pipelets into the tower. The elements of the ladder-type distributor are sized such that the only significant pressure drop which occurs in liquid flowing within the ladder-type distributor occurs in the pipelets. These hollow pipelets are sized with their inside diameter small enough to maintain the liquid transfer lines and distributor tubes full of liquid and also small enough to maintain a significant level of liquid within the liquid feed conduit so as to create a uniform pressure head on the liquid within the array of distributor tubes. Such a pressure head serves to produce much more uniformity of flow from the pipelets. This is true since this pressure head is so much greater than the small pressure differentials on the pipelets when the major pressure differentials on the liquid within an ordinary redistributor are due to the unplanned deviations from perfect levelness of the distributor tubes and pipelets. These deviations in pressure produce undesired non-uniformity of flow. Thus the pressure head of the liquid in the conduit is quite beneficial.

The pipelets, preferably, also extend upwardly into the distributor tubes a sufficient distance so as to avoid being plugged by solid debris in the liquid which is denser than the liquid but nevertheless which is carried along the bottom of the distributor tubes by the liquid. However, the pipelets do not extend so far upwardly into the distributor tubes as to be pluged by any solid debris particles floating along the top of the liquid within the distributor tubes.

The distributor tubes are spaced far enough apart to allow the free flow of vapor between the tubes.

PREFERRED EMBODIMENT FEATURES

In a preferred embodiment of this invention the duct walls have spaced openings located in them at the same height in the reservoir above the plate of the liquid-collecting apparatus. The purpose of these openings is to allow the liquid collected in the reservoir to pass through the duct walls in a uniform manner and trickle down the interior of the duct walls into the tower below. Usually the tower section below contains a bed of tower packing. Preferably these opeinings are spaced apart in a uniform pattern. These openings can be of any shape, and in fact they can be channels cut all the way to and through the top of the duct walls. One particularly useful opening shape is a triangle in the shape of the Greek capital letter delta turned upside down, i.e., an inverted Δ. These openings provide for an overflow of liquid insofar as the capability of the pipelets to distribute the liquid is concerned. But yet this overflow is still distributed fairly uniformly, albeit not as uniformly as the liquid being distributed by the pipelets extending from the bottom of the distributor tubes of the ladder-type distributor. However, circular-shaped orifices are the most preferred opening shape for openings in the duct walls of the liquid collecting apparatus.

A further preferred embodiment employs duct walls in the liquid collecting apparatus which extend below the bottom of the plate of this apparatus. Thus liquid flowing down the interior of the duct walls will have no opportunity to transfer from the duct walls to the bottom of the plate, then flow along some unpredictable path along the bottom of the plate, and then fall from the plate in some uncontrolled, indiscriminate location.

Drip rods, located on the interior of the duct walls, are an additional feature which can be employed to more uniformly distribute any overflow liquid collected in the reservoir of the liquid collecting apparatus. These drip rods are substantially vertically oriented and substantially parallel. They are spaced apart in a manner such that substantially every opening in the duct walls has a pair of drip rods associated with it. One rod of the pair is adjacent to an opening on one of that opening's sides and the other drip rod of that pair is adjacent to that opening on the opposite side of that opening. These drip rods extend below the bottom of the duct walls so that the liquid flowing from each duct wall opening will flow between the drip rods to the ends of the drip rods before it falls into the tower. More uniform distribution of the overflow liquid is assured when using these drip rods because these drip rods guide the overflow liquid into the tower and, of course, these drip rods are spaced in a uniform pattern with respect to an imaginary horizontal cross-section of the tower located immediately beneath the bottom ends of the drip rods.

Another preferred feature of this invention is to have the upper end of the liquid feed conduit extend into the reservoir of the liquid collecting apparatus sufficiently far enough above the plate to prevent entry into the conduit of any solid debris in the liquid which is lying along the bottom of the reservoir because it is more dense than the liquid. Similarly, it is preferred that the top of the conduit should not extend into the reservoir so high as to be as high as the bottom of the overflow openings in the duct walls in order that solid particles floating at the top of the liquid will not enter the conduit and be fed into the ladder-type distributor.

BRIEF DESCRIPTION OF THE DRAWING FIGURES

The invention will be better understood by reference to the drawing figures wherein the preferred embodiment of the body is illustrated, wherein like reference numerals refer to like parts in the different drawing figures, and wherein.

DETAILED DESCRIPTION OF THE PREFERRED EMBODIMENT

Figure 1:
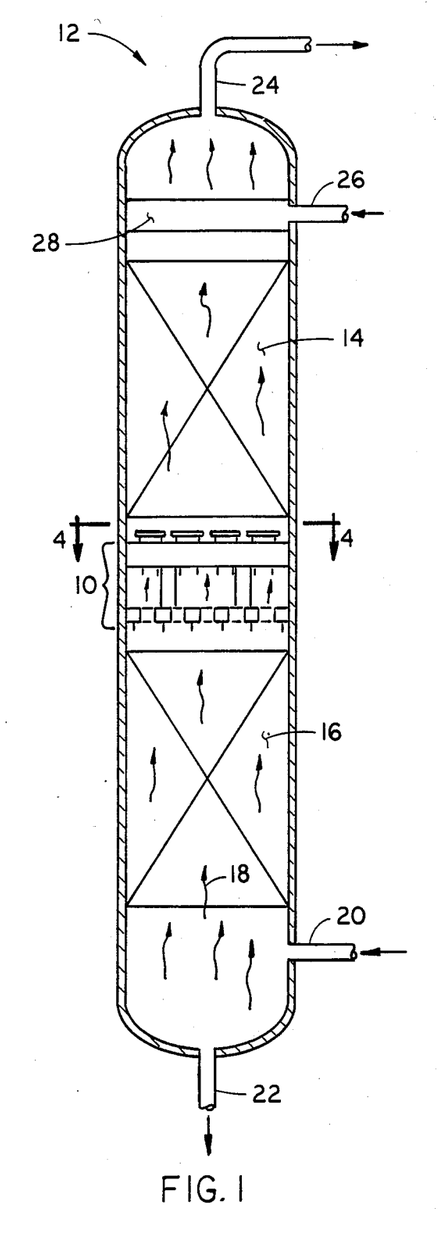
FIG. 1 is a sectional side view of a simplified tower 12 employing the preferred embodiment of the liquid redistributor assembly 10 of this invention.

Referring to FIG. 1, the liquid redistributor assembly 10 of this preferred embodiment is shown installed in a typical, albeit simplified, liquid-vapor contact tower 12. Tower 12 is shown as being a packed column having an upper bed 14 of column packing and a lower bed 16 of column packing with column bed 14 being above assembly 10 and column bed 16 being beneath it. Vapor is shown rising in tower 12 through beds 16 and 14 and assembly 10 with the vapor being represented by wavy lines 18 having upwardly pointing arrowheads upon their upper ends. A liquid organic feed is fed into the bottom of tower 12 through inlet pipe 20. In tower 12, part of the liquid feed is vaporized to form vapor 18 by any convenient means or method. The unvaporized liquid is removed from tower 12 through bottoms outlet pipe 22. The vapor 18 rises in tower 12 through packed bed 16, on through liquid redistributor assembly 10, on through packed bed 14 and out of the top of tower 12 through vapor outlet pipe 24.

Liquid is fed into the top of tower 12 through pipe 26. Often this liquid is condensed organic vapor which has come from the tower via line 24, condensed outside of tower 12 by some cooling means (not shown), and recycled back into the top of tower 12. However, this liquid need not be such recycled, condensed organic vapor. It can be some other liquid.

But whatever the source of the liquid flowed into tower 12 via pipe 26, it is desired that this liquid be intimately contacted with the vapor rising in tower 12. Thus the liquid from pipe 26 is distributed across the top of packed bed 14 by distributor 28. Distributor 28 is not a part of this invention, and it, therefore, is shown more abstractly inasmuch as it can be any liquid distributor for packed towers, of which there is already a large variety.

From distributor 28 the liquid falls in a fairly uniformly distributed manner onto the bed 14 of column packing. As the liquid seeps downwardly through the column packing of bed 14 it is contacted by the rising vapor 18. Intimate uniform contact of vapor and liquid is what is desired in bed 14. However, as is well known with beds of column packing, the further down the liquid seeps into bed 14, the more it tends to depart from being uniformly distributed. Maldistribution phenomena occur such as the liquid's forming channels in the column packing or the liquid's migrating to and adhering to the interior of the tower wall as it flows downwardly. This maldistribution of the liquid is corrected by insertion of liquid redistributors positioned at strategically designed locations in the tower.

Thus in tower 12 the preferred embodiment of the liquid redistributor assembly 10 of this invention is shown positioned beneath packed bed 14 to collect the maldistributed liquid coming out of the bottom of bed 14 and then to redistribute this liquid uniformly across the top of packed bed 16. This allows there to be much more of the desired intimate, uniform mixing between the ascending vapor and the descending liquid in the column packing of bed 16 than there would otherwise be.

Figure 2:
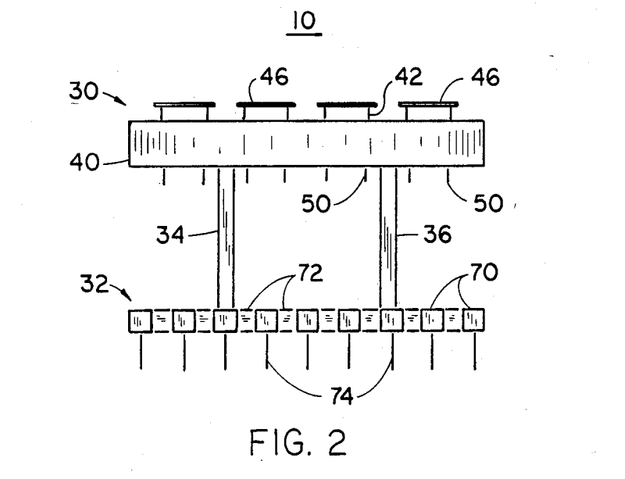
FIG. 2 is a simplified side view of the liquid redistributor assembly 10, said side view being shown without dashed lines which are ordinarily used to show hidden sub-elements.
Figure 3:
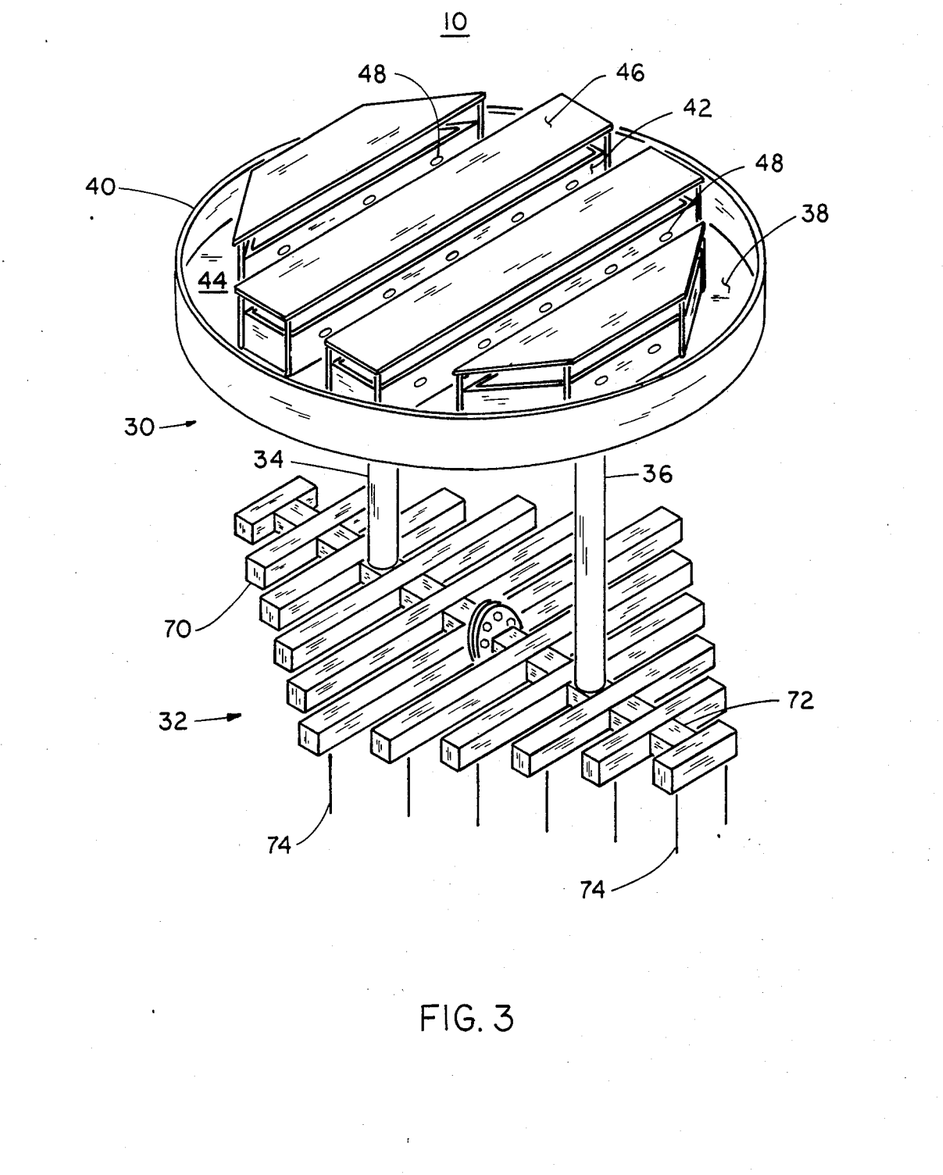
FIG. 3 is a perspective view of the preferred embodiment of the liquid redistributor assembly 10 of this invention.

By referring to FIGS. 2 and 3 a better appreciation of the major elements of the preferred embodiment of the liquid redistributor assembly 10 of this invention can be obtained. Assembly 10 has three major elements in combination. These major elements, as shown in their preferred embodiments, are: (A) a liquid collecting apparatus denoted generally by reference number 30; (B) a ladder-type liquid distributor denoted generally by the reference number 32; and (C) two liquid feed conduits 34, 36 which provide a means for liquid to flow from the liquid collecting apparatus 30 down to the ladder-type liquid distributor 32. Liquid feed conduits 34, 36 also provide a means for establishing a liquid head pressure on the liquid within the ladder-type liquid distributor 32 so as to produce a more uniformly distributed flow from it. Two of these three major elements, the liquid collecting apparatus 30 and the ladder-type liquid redistributor 32, have numerous sub-elements. They therefore, require a substantial amount of description. These sub-elements will be described under appropriate sub-headings below.

A. Liquid Collecting Apparatus

The preferred embodiment of the liquid collecting apparatus 30 is illustrated with greater particularity in FIGS. 4–9. With one significant exception, the preferred embodiment of the liquid collecting apparatus 30 is seen in FIGS. 1–9 to have the same structure as the preferred embodiment of the redistributor 10 disclosed in FIGS. 1–7 of Harper et al., U.S. Pat. No. 4,432,913, issued Feb. 21, 1984, having a filing date of Feb. 23, 1983, and an application Ser. No. of 469,077 filed Feb. 23, 1983. The exception in structural difference between the liquid collecting apparatus 30 of the present invention and the liquid redistributor 10 of the Harper et al. issued patent is the presence of the liquid feed conduits 34 and 36 in the present invention and their absence in the Harper et al. patent. In the present invention, conduits 34 and 36 are connected to the present invention's liquid collecting apparatus 30. This difference changes the primary function of the already patented redistributor from a liquid distributing function to primarily a liquid collecting device in the present invention.

Figure 4:
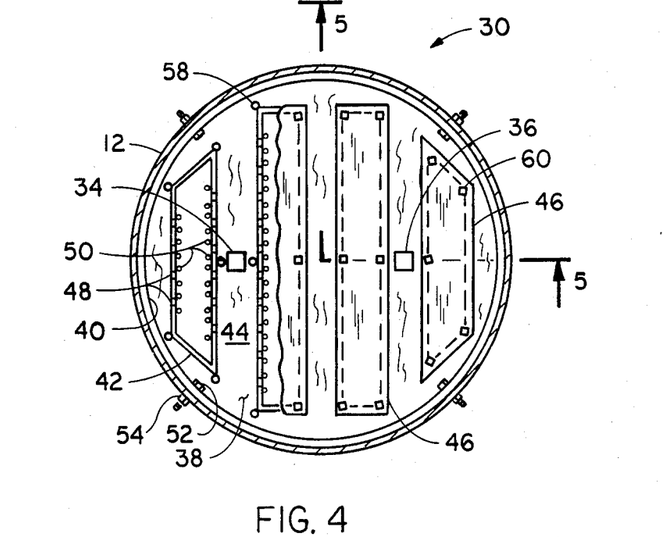
FIG. 4 is a partially broken away, top view of the preferred embodiment of the liquid distributor assembly 10 of this invention as seen taken along line 4—4 in FIG. 1, said top view showing the liquid collecting apparatus 30 and the liquid feed conduits 34, 36 of the liquid redistributor assembly, but not showing the assembly's ladder-type redistributor 32 which is disposed beneath the assembly's liquid collecting apparatus 30.
Figure 5:
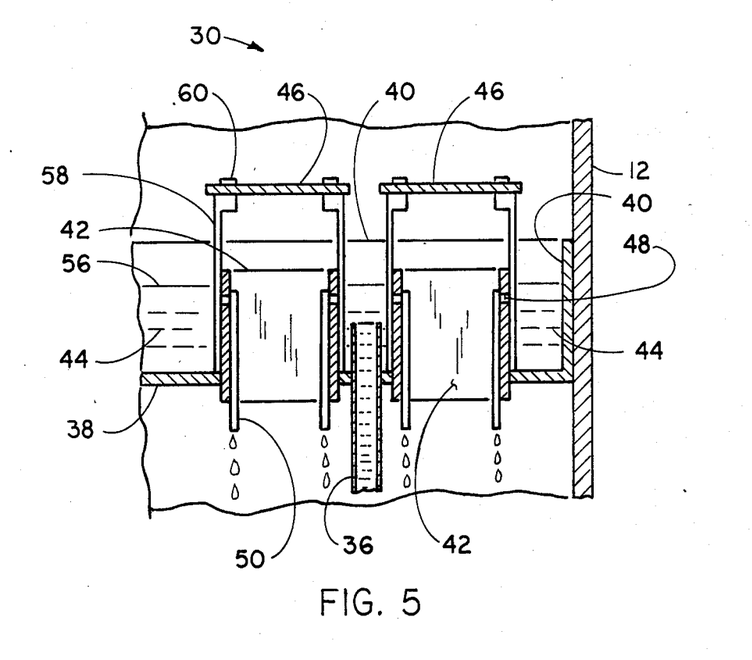
FIG. 5 is an enlarged partial side view of part of the liquid collecting apparatus 30 of FIG. 4 taken along line 5—5 in FIG. 4 except that this figure shows liquid in the reservoir 44.
Figure 6:
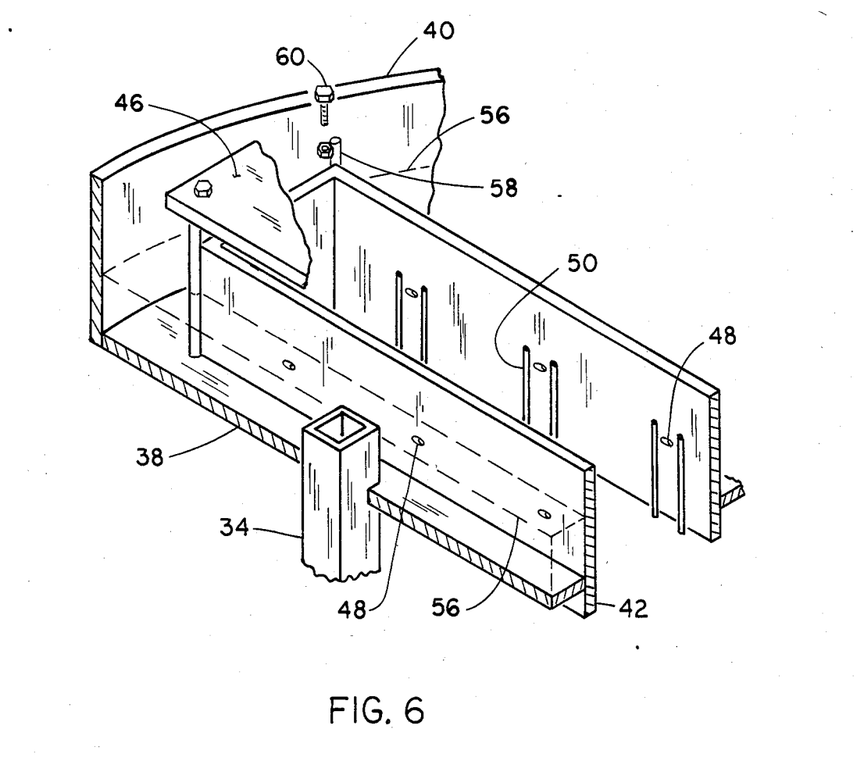
FIG. 6 is an enlarged, fragmentary, perspective view of the preferred embodiment of the liquid collecting apparatus 30 and part of a feed conduit 34 of the preferred embodiment of the liquid redistributor assembly 10.

In FIGS. 4–6, the preferred embodiment of the liquid collecting apparatus 30 is seen to be comprised of: (1) a horizontally disposed bottom plate 38 having a plurality of openings in it; (2) an upstanding flange 40 sealably attached to and extending above the periphery of the horizontal bottom plate 38; (3) a vertically oriented vapor duct 42 disposed in and sealably attached to each of the openings which are located in the bottom of plate 38; (4) a liquid collection reservoir 44 located above bottom plate 38 and between the inside of the upstanding flange 40 and the outside of the spaced ducts 42; (5) a plurality of roofing plates 46 serving as a roofing means for each of the vapor ducts 42 with each vapor duct 42 having a roofing plate 46 positioned directly above it to prevent liquid from falling from bed 14 directly into and through the vapor ducts 42 onto bed 16, and with each of the roofing plates 46 also elevated high enough above the top of its respective vapor duct 32 to allow vapor to pass upwardly from bed 16 through and out of vapor ducts 42 without undergoing any significant detrimental pressure drop; (6) a plurality of circularly shaped, spaced orifices 48 positioned in the walls of the vapor ducts 42 at the same height above the bottom plate 48 to provide an overflow liquid distributing means for the overall liquid redistributor assembly 10, orifices 48 being spaced from one another in a substantially uniformly spaced apart pattern; and (7) a multiplicity of substantially parallel, substantially vertically oriented drip rods 50 welded to the inside (i.e. vapor side) of the walls of the vertical vapor ducts 42 with said drip rods extending below the bottom edge of the walls of ducts 42.

Referring to FIGS. 3–5, upstanding flange 40 and bottom plate 38 are seen to form a pan-like arrangement suitable for holding liquid. This pan-like arrangement is sized so that upstanding flange 40 is flush against the walls of the tower 12 so as to be capable of collecting any liquid flowing down the interior of the tower wall. (See FIGS. 1, 4 and 5).

The walls of vapor ducts 42 extend below the bottom of bottom plate 38 so that liquid flowing down the interior sides of the ducts will have no opportunity to transfer from the duct walls to the bottom of the plate 38 and thereby fall from said plate in an indiscriminate, maldistributed manner.

Figure 7:
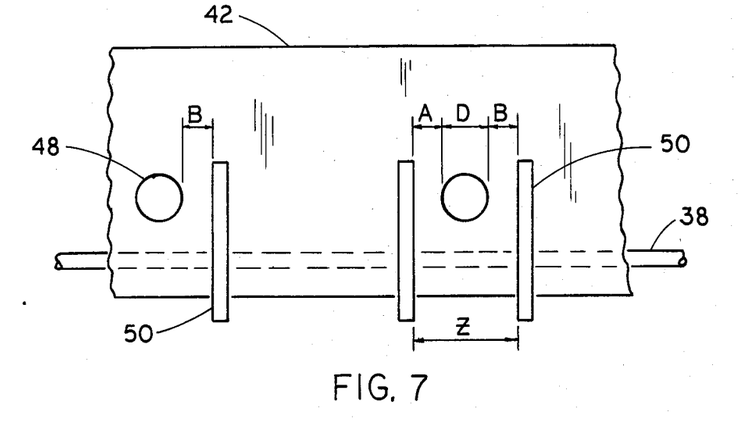
FIG. 7 is a side view of a segment of a wall of a duct 42 of the preferred embodiment of the liquid collecting apparatus 30 as seen from the vapor side of the duct wall 42 showing the relationships between an orifice 48 in the duct wall, the orifices' pairs of drip rods 50, and between the orifices and the horizontal bottom plate 38.
Figure 8:
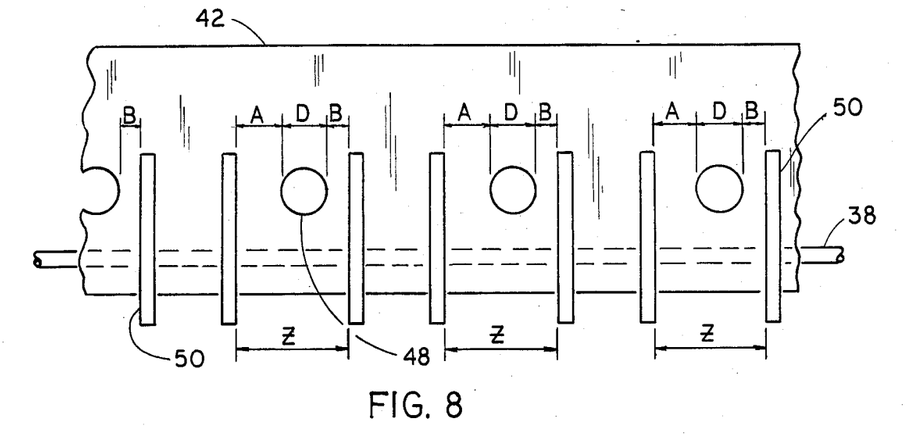
FIG. 8 is an alternative embodiment of the embodiment shown in FIG. 7 illustrating how drip rods 50 can be offset from their respective orifices 48, that is, the distance "A" is not equal to the distance "B"

The drip rods 50 are attached to the inside of the vapor ducts in a manner such that each circularly shaped orifice 48 has a pair of drip rods associated with it. The preferred embodiment has its drip rods spaced so that each drip rod of the pair of drip rods associated with a particular circular orifice 48 has both of its drip rods spaced equidistant from it. Its left side drip rod is spaced on its left side at a distance from it which is equal to about one-half of the diameter of it, and its right side drip rod spaced on its right side the same distance from it.

Equidistant spacing of drip rods 50 from orifices 48 is illustrated in FIG. 7 where the spacing distance "A" equals the spacing distance "B". In the most preferred embodiment, $A=B=(D \div 2)$. However, the pair of drip rods 50 associated with each of the orifices 48 do not have to be spaced so that $A=B=(D \div 2)$. They can be spaced so that $A=B \neq (D=2)$. They can even be spaced such that $A \neq B$. (See FIG. 8). The more important criterion for the preferred spacing of drip rod pairs is that $A+B+D=Z$ be true for all drip rod pairs, where A, B, D and Z are each a constant value. With $A+B+D=Z$ for all drip rod pairs, then liquid flowing from one orifice 48 has the same channel of space between drip rods 50 from which to be distributed as does the liquid flowing from any other orifice 48.

Figure 9:
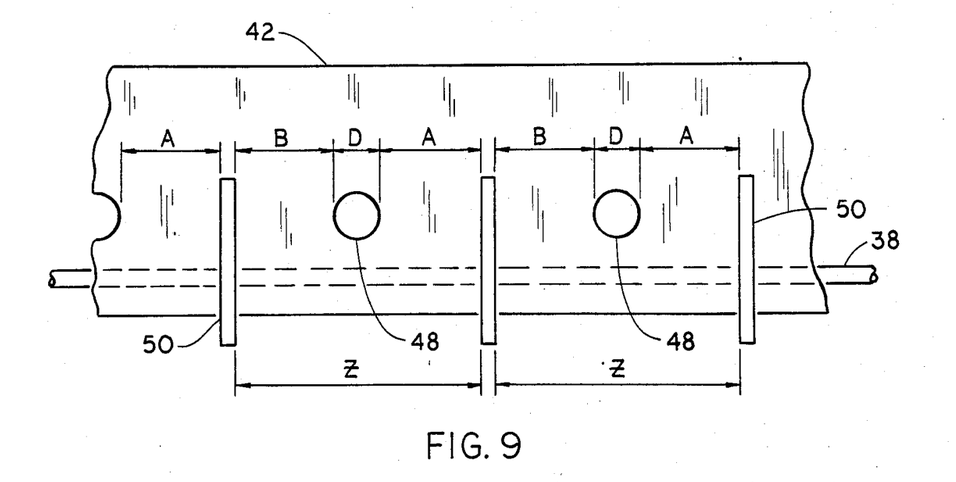
FIG. 9 is an alternative embodiment of the embodiment of FIG. 7 showing the special relationship between pairs of drip rods to their respective openings wherein one drip rod 50 can serve as the right side drip rod for one pair of drip rods for one orifice 48 while simultaneously serving as the left side drip rod 50 for a pair of drip rods associated with an adjacent orifice 48.

FIG. 9 illustrates the special case where the drip rods 50 are spaced such that one drip rod can serve as the left side drip rod for one pair of drip rods and is also the right side drip rod for an adjacent pair of drip rods, i.e., the case where there is only one drip rod between each orifice. In this special case, it is still preferred to have $A+B+D=Z$. Note that this preferred criterion of having $A+B+D=Z$ still does not require that $A=B$. However "D" should be constant for all round orifices 48 in the preferred embodiment.

Before going on to discuss the ladder-type liquid distributor 32 of the preferred embodiment of liquid redistributor assembly 10 and normal liquid distribution from it, it is convenient at this point to discuss how the liquid collecting apparatus 30 functions in normal operation and in overflow operation. (See FIGS. 1-9). In either operation liquid falling from the bottom of packed bed 14 (FIG. 1) falls either directly or indirectly into reservoir 44 (FIGS. 3-5). The liquid falls indirectly into reservoir 44 either by: (1) falling onto the duct roofs 46 and then flowing off of these roofs 46 into the reservoir 44, or (2) flowing down the sides of the walls of tower 12 until it, the liquid, flows onto the top of flange 40 from where it is forced to flow down the interior of flange 40 into reservoir 44. Flange 40 is bolted to tower 12 by bolts 52 and nuts 54.

In normal operation, the liquid in reservoir 44 will rise ideally just enough to keep the liquid level 56 in reservoir 44 just above the tops of liquid feed conduits 34 and 36. The tops of liquid feed conduits 34 and 36 are located at the same elevation in reservoir 44. This elevation is located above the bottom plate 38 in order not to have any debris located on the bottom of reservoir 44 enter conduits 34 and 36 and flowing down into the ladder-type liquid redistributor 32 where it could plug the outlet pipelets 74 of tube 70 of redistributor 32. Conduits 34 and 36 are sealably welded to plate 38.

In an overflow mode of operation the liquid flowing into reservoir 44 is flowing at too fast a rate for the ladder-type liquid redistributor 32 to handle by itself. This is where a synergistic distribution of the liquid comes into effect. In this situation (refer to FIG. 5), the liquid level 56 in reservoir 44 rises until liquid flows from reservoir 44 through orifices 48 in the vapor ducts 42. Inside ducts 42, the liquid flows downwardly from each orifice 48 between that orifice's pair of drip rods 50 in a uniformly distributed manner across bed 16. The greater the surge flow rate of the liquid into the reservoir 44, then the greater will be the liquid level 56 above orifices 48 as well as conduits 34, 36, and then the greater will be the liquid pressure head above these orifices and conduits. Consequently, the greater will be the liquid flow rate through these orifices and conduits. This increase in flow rate through these conduits and orifices will, therefore, compensate for the surge of liquid into the reservoir 44. More importantly it will compensate for such surges by redistributing the surplus liquid in a uniform manner across the top of bed 16. (See FIGS. 5, 6 and 1).

The vapor passes through liquid collecting apparatus 30 by rising upwardly through vapor ducts 42. The roofing plates 46 are maintained at a level above the tops of vapor plates 46 by nut-rods 58. This level is sufficiently high and the ducts 42 are designed sufficiently large and sufficiently numerous to allow the passage of the vapor through collecting apparatus 30 without undergoing any appreciable, detrimental pressure drop. Nut-rods 58 are rods welded to the vapor ducts 42 with a nut welded to the top of each rod. The roofing plates 46 rest on the top of nut-rods 58 and are secured to the nut-rods 58 by bolts 60. (See FIGS. 4-6).

The liquid feed conduits 34 and 36 extend upwardly through and above bottom plate 38 in the preferred embodiment as partially shown in FIG. 5. Conduits 34, 36 both extend to the same horizontal height within the reservoir 44 of the liquid-collecting apparatus 30, and this height is located within reservoir 44 about midway between bottom plate 38 and the bottoms of orifices 48. This height prevents solid debris located on the bottom of reservoir 44 from entering conduits 34, 36. This debris is often present in industrial processes and mostly arrives in the reservoir 44 with the liquid falling from bed 14. Conduits 34, 36 are sealably welded to bottom plate 38 so that liquid is forced to escape first from reservoir 44 by passing through conduits 34, 36.

B. Ladder-Type Liquid Redistributor

Referring to FIGS. 2 and 3, liquid from liquid collecting apparatus 30 flows downwardly through liquid feed conduits 34 and 36 into ladder-type liquid redistributor 32 for its uniform distribution in bed 16 (FIG. 1).

Figure 10:
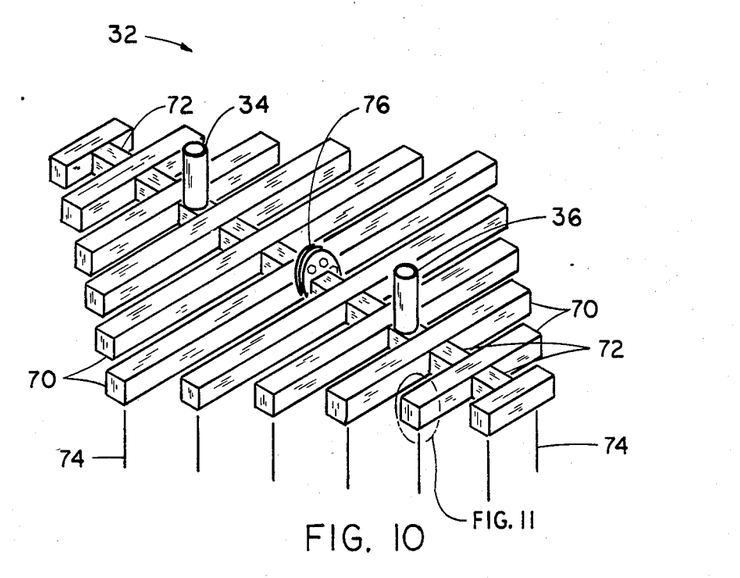
FIG. 10 is a perspective view of the preferred embodiment of the ladder-type liquid distributor 32 and part of the two liquid feed conduits 34, 36 of this invention.
Figure 11:
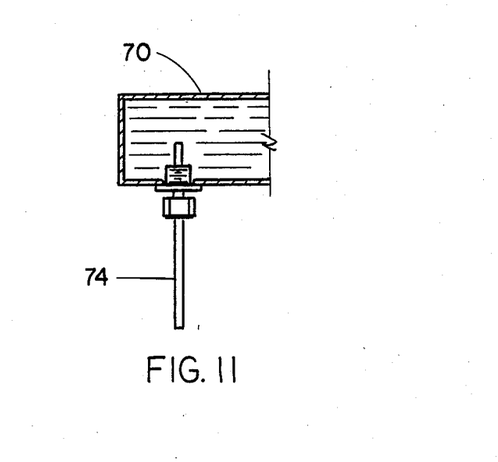
FIG. 11 is an enlarged, fragmentary, sectional side view of the end of one of the distributor tubes 70 of the preferred embodiment of the ladder-type liquid redistributor 32 of FIG. 10 particularly showing the distributor tube's 70 hollow pipelet 74 which is indicated by the dashed, encircled section in FIG. 10 which is assigned the reference name "FIG. 11" in FIG. 10.
Figure 12:
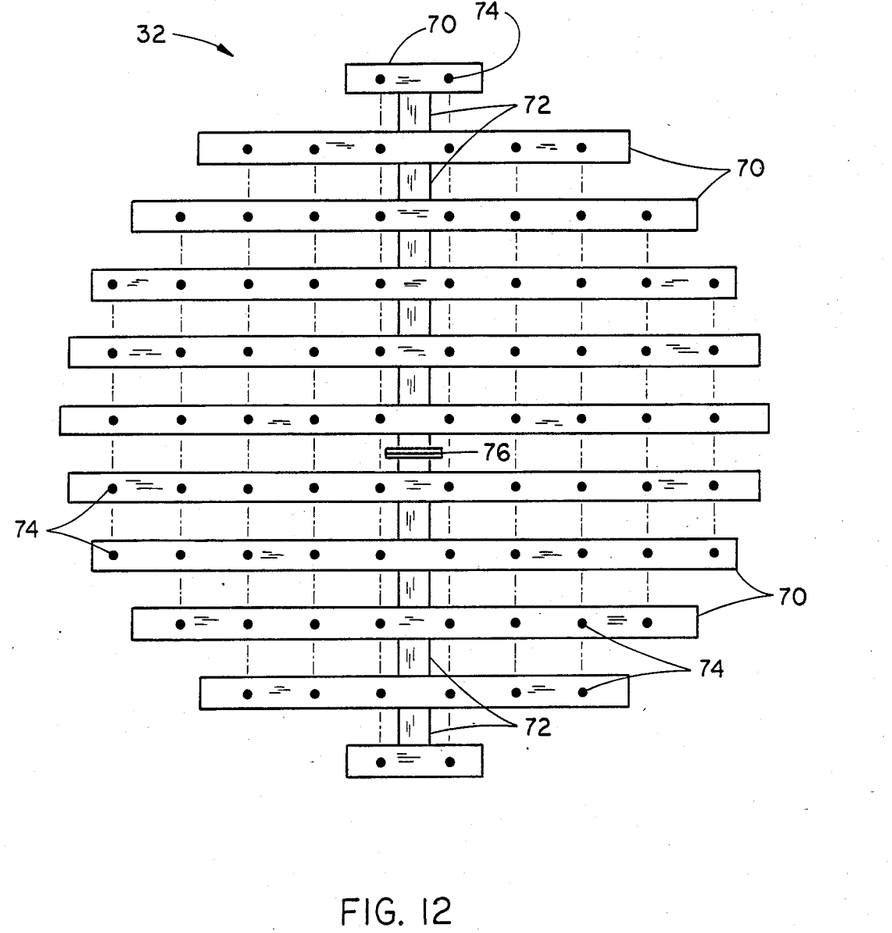
FIG. 12 is a bottom view of the ladder-type liquid distributor 32 of FIG. 10 showing the pipelets 74 spaced in the preferred uniform distribution pattern, a square spacing pattern.

The preferred ladder-type liquid redistributor 32, its parts, and its liquid distribution pattern are illustrated in FIGS. 1-3 and in FIGS. 10-12. Referring more particularly to FIGS. 2, 3, 10 and 12, ladder-type liquid redistributor 32 is seen to be comprised of: (1) an array of spaced apart, substantially parallelly disposed, hollow, liquid distributor tubes 70; (2) hollow transfer lines 72 which structurally connect the distributor tubes together and which provide closed, liquid communication channels between the distributor tubes 70 and the liquid feed conduits 34, 36; and (3) a plurality of substantially parallelly oriented, uniformly spaced apart, hollow pipelets 74 which are sealably inserted into the bottoms of the distributor tubes 70.

The array of distributor tubes 70 are enclosed tubes except for the openings provided in them for connecting the transfer lines 72 between them to provide fluid communication between the distributor tubes 70, and also except for the openings provided in the bottom of the tubes 70 through which the pipelets 74 are inserted. This liquid flowing down from reservoir 44 of the liquid collecting apparatus 30 through liquid feed conduits 34 and 36 is allowed to flow only through transfer lines 72, distributor tubes 70, and pipelets 74 before escaping from the ladder-type redistributor 32 into bed 16.

The openings in the liquid feed conduits 34 and 36 through which the liquid flows, the openings in liquid transfer lines 72 through which the liquid flows, the openings in the distributor tubes 70 through which the liquid flows, and the openings in the hollow pipelets 74 through which the liquid flows are all cooperatively sized so that, relatively speaking, the only significant pressure drop which occurs in this flowing liquid occurs in the liquid as it flows through pieplets 74. Relatively significant pressure drop here means that the pressure drop of the liquid flowing through the pipelets is at least ten times greater than the sum of the pressure drops undergone by the liquid as it flows through conduits 34 and 36, transfer lines 72, and distributor tubes 70. Preferably this pressure drop is even higher, e.g., 15:1 or even 20:1.

This pressure drop relationship is the key factor in getting liquid to flow from all of the pipelets 74. Achieving this pressure drop relationship is achieved by controlling the length of the pipelets 74 and making the openings in them to be relatively small with respect to the opening in the conduits, transfer lines, and distributor lines. But such small distributor openings are known to be easily plugged by solid debris present in most liquids. Avoiding plugging of these pipelets 74 thus becomes a critical problem in achieving the desired improvement in distribution of the liquid. As has already been described above, this preferred embodiment greatly reduces the presence of debris in the liquid by merely having conduits 34 and 36 extend upwardly into reservoir 44 away from the bottom plate 38 of liquid collecting apparatus 30. This avoidance of limiting entry of debris into pipelets 74 is further enhanced by extending the pipelets 74 upwardly into the distributor tubes 70. Any debris that has entered distributor tubes 70 and that is more dense than the liquid will thus reside along the bottom of distributor tubes 74 and not at the higher level in the liquid wherein the liquid enters the tops of the pipelets. Any debris which is less dense than the liquid will float at the top of the liquid within the distributor tubes 70. To avoid plugging of the pipelets 74 by this floating material, the pipelets 74 do not extend to the tops of the distributor tubes 70, but rather extend about midway between the top and bottom of distributor tubes 70.

In order to keep the distributor tubes 70 full of liquid and a significantly high pressure impressed on the liquid flowing through pipelets 74, the pipelets' openings have to be sized small enough to keep the distributor tubes 70 and transfer lines 72 full of liquid and also to keep the conduits 34 and 36 sufficiently full of liquid to form a pressure drop of the liquid flowing through the pipelets which is at least about ten times as great as the sums of the pressure drops incurred by the liquid as it flows through the conduits 34 and 36, transfer lines 72 and distributor tubes 70. The meaning of the sums of the pressure drops of the liquid flowing through the conduits 34 and 36, the transfer lines 72, and the distributor tubes 70 as used herein is the greatest of the pressure drops undergone by the liquid as measured between the lower of the two tops of the two liquid levels in the two conduits 34 and 36 and the liquid entrance to any of the pipelets 74.

The preferred square spacing pattern of pipelets 74 is illustrated in FIG. 12. The distributor tubes 70 and pipelets 74 are spaced so that the distance between adjacent distributor tubes 70 is the same as the distance between adjacent pipelets 74 located on each of the distributor tubes 70 with the first pipelets 74 on each of the distributor tubes 70 being the same distance from the central axis of the array with said axis being taken along the row of transfer lines 72.

Of course, the distributor tubes 70 are spaced far enough apart to allow vapor to rise between them in a tower in an operational mode without undergoing any significantly detrimental pressure drop in the process being carried out in the tower. Operational mode as used herein is defined to mean a process that is being carried out in a tower under ordinary operational conditions with the tower being one in which the invention is installed.

Ladder-type liquid distributor 32 can be seen in FIG. 10 to have a disconnect flange 76. This disconnect flange is used to assemble the array of distributor tubes 70.

Having described the invention, we claim:

1. A liquid redistributor assembly capable of being used in a liquid-vapor contact tower in which it is desired to collect liquid falling from a bed of column packing positioned above the liquid redistributor assembly in the tower and then have the liquid redistributor assembly uniformly redistribute this collected liquid across an imaginary horizontal cross-section of the tower, said cross-section being located immediately below the liquid redistributor assembly, while allowing vapor to rise upwardly in the tower and freely flow through the liquid redistributor assembly, said liquid redistributor assembly being comprised of:

A. A liquid collection apparatus comprised of:
   1. a plate which is horizontally disposed when installed in the tower with said plate having a plurality of spaced openings passing through it to allow easy passage of vapor through said plate;
   2. an upstanding flange sealably attached to and extending above the periphery of said horizontal plate;
   3. a vertically oriented duct located in each of said plate openings, said ducts being open at their tops and bottoms so as to allow vertical passage of vapors through the plate, said vertical ducts being sealably attached to said horizontal plate, said ducts having walls extending upwardly above said plate, said duct walls of said liquid collecting apparatus having openings all being positioned above the upper end of the feed conduit and above the horizontal plate of the collecting apparatus when the redistributor assembly is operationally disposed in a liquid-vapor contact tower so that liquid rises to the level of such openings only at higher liquid flow rates;
   4. a liquid collection reservoir located above said plate and between the inside of the upstanding flange and the outside of the walls of the spaced ducts so as to be capable of collecting a liquid in said liquid collection reservoir when said liquid is falling from above said liquid collecting apparatus;
   5. a roofing means over each of said ducts for causing all liquid falling on top of said liquid collecting apparatus to be collected in said liquid collection reservoir instead of allowing any of said falling liquid from falling directly through the ducts of said liquid collecting apparatus, said roofing means also being means which allow lowpressure drop passage of vapor directly through said ducts and said liquid collecting apparatus;

B. at least one feed conduit which is sealably connected to the bottom or plate of said liquid collecting apparatus in a manner such that the feed conduit will be in liquid communication with any liquid present in the liquid collection reservoir, the upper end of the feed conduit extending sufficiently far enough into the liquid collecting apparatus so as to prevent having any solid debris collected on the bottom of said reservoir from flowing into the feed conduit's upper end and thus ultimately into, and thereby plugging of, the narrow opening hollow pipelets which descend from the distribution tubes of the ladder-type liquid distributor; and C. a ladder-type liquid distributor disposed beneath said liquid collecting apparatus, said ladder-type liquid distributor being sealably connected with the bottom end of said liquid feed conduit in a manner such that said ladder-type liquid distributor is in liquid communication through said conduit with said liquid collection reservoir and in a manner such that liquid is fed to the ladder-type distributor from the liquid collecting apparatus and in a manner such that a pressure head of liquid from the liquid in the conduit would be maintained on any liquid located inside of the ladder-type distributor, said (1) an array of spaced apart, substantially parallelly disposed, hollow, liquid distributor tubes; (2) hollow transfer lines which structurally connect the distributor tubes together and which also provide liquid communication between the distributor tubes themselves and between the distributor tubes and the liquid feed conduit; and (3) a plurality of substantially parallel, spaced, hollow pipelets sealable inserted through the bottom of said distributor tubes;

said array of tubes being enclosed tubes except for openings provided in them for said pipelets, said connecting transfer lines, and said liquid feed conduit;

said pipelets, transfer lines, and feed conduit being sealably connected into said openings such that the distributor tubes of said ladder-type liquid distributor will be disposed horizontally across a horizontal section of the tower and said pipelets will be extending vertically downwardly from the bottoms of said distributor tubes;

said openings, pipelets, transfer lines, and feed conduit being sized in such a fashion so that the pipelets, transfer lines, and feed conduit can be sealably connected into said openings in a manner such that all flow of liquid into the ladder-type distributor comes from the liquid feed conduit, such that all of the flow out of the ladder-type distributor would come out of the pipelets, and such that the flow of liquid from one distributor tube to an adjacent distributor tube is through at least one transfer line;

said pipelets not only being sealaby fitted into the bottoms of said distributor tubes but also extending upwardly into said distributor tubes when said distributor tubes are horizontally disposed as in an operational configuration in a vapor-liquid contact tower, with said pipelets extending far enough into said distributor tubes so as to avoid being plugged by heavier than liquid debris washing along the bottom of the tubes with the liquid, but with said pipelets not extending so far upwardly into the tubes as to be capable of having lighter than liquid debris floating on the top of the liquid to flow in the upper portions of the tubes;

the size of the openings inside of the distributor pipelets, distributor transfer lies, distributor tubes, and the liquid feed conduit being designed such that virtually all of the pressure drop of a liquid flowing through these elements occurs in the pipelets, said pressure drop in said pipelets being sufficiently high so as to maintain liquid backed up in said distributor tubes, transfer lines, and liquid feed conduit so as to keep the distributor tubes at least about one-fourth full of liquid substantially all of the time when the liquid redistributor apparatus is operationally disposed in a liquid-vapor contact tower;

said distributor tubes of said distributor being spaced sufficiently far apart to allow the free flow of vapor between said tubes;

said distributor pipelets being spaced from one another in a fashion so as to produce at least a substantially uniform pattern of liquid distribution across an imaginary horizontal planar section of a tower when said tubes are disposed located immediately above said section in an operational mode.

2. The liquid redistributor assembly of claim 1 which further comprises having openings in said duct walls of said liquid collecting apparatus with said openings all being positioned at the same height along said ducts when the redistributor assembly is operationally disposed in a liquid-vapor contact tower.

3. The assembly of claim 2 wherein the openings are circularly-shaped orifices.

4. The assembly of claim 3 which further comprises having the duct walls extend below the horizontal plate member so that liquid flowing down the interior sides of the ducts, after it has flowed from the reservoir through the orifices into the interior of the duct walls, will have no opportunity to transfer from the duct walls to the bottom of the plate and thereby fall from said plate in an indiscriminate, maldistributed manner.

5. The assembly of claim 3 which further comprises having a multiplicity of substantially parallel, substantially vertically oriented drip rods attached to the inside of the ducts, that is the vapor side of the duct walls, in such a fashion so that substantially all of the orifices in the duct walls have a pair of drip rods associated with them, one drip rod being adjacent to an orifice on one side of that orifice and the other drip rod being adjacent to that orifice on that orifice's opposite side;

said drip rods extending below the bottom of the duct walls so that any liquid which is emerging from the orifices will flow downwardly between and along each orifice's pair of drip rods to the lower ends of said drip rods from whence they fall further into the tower in a uniformly distributed manner.

6. The assembly of claim 1 wherein the openings are circular-shaped orifices.

7. The assembly of claim 6 which further comprises having the duct walls extend below the horizontal plate member so that liquid flowing down the interior sides of the ducts, after it has flowed from the reservoir through the openings into the interior of the duct walls, will have no opportunity to transfer from the duct walls to the bottom of the plate and thereby fall from said plate in an indiscriminate, maldistributed manner.

8. The assembly of claim 7 which further comprises having a multiplicity of substantially parallel, substantially vertically oriented drip rods attached to the inside of the ducts, that is the vapor side of the duct walls, in such a fashion so that substantially all of the orifices in the duct walls have a pair of drip rods associated with them, one drip rod being adjacent to an orifice on one side of that orifice and the other drip rod being adjcent to that orifice on that orifice's opposite side;

said drip rods extending below the bottom of the duct walls so that any liquid which is emerging from the orifices will flow downwardly between and along each pair of drip rods to the lower ends of said drip rods from whence they fall further into the tower in a uniformly distributed manner.

* * * * *

UNITED STATES PATENT OFFICE
CERTIFICATE OF CORRECTION

PATENT NO. : 4,689,183

DATED : August 25, 1987

INVENTOR(S) : Roger L. Helms and Stephen M. Harper

It is certified that error appears in the above-identified patent and that said Letters Patent is hereby corrected as shown below:

In the Abstract insert --The collecting apparatus distributes the liquid uniformly during a liquid surge within the tower which the ladder-type redistributor can not handle.-- after the last line.

Col. 2, line 17, after "and" insert --redistribute it below in the same tower. This patent,--; line 55, "applly" should read --apply--.

Col. 4, line 29, "differentials" should read --differential--; line 56, "opeinings" should read --openings--.

Col. 9, line 9, "(D=2)" should read --(D ÷ 2)--.

Col. 10, line 9, "nut-rods" should read --nut-rod--.

Col. 11, line 6, "pieplets" should read --pipelets--.

Col. 13, line 9, "reservior" should read --reservoir--; line 27, insert --ladder-type distributor being comprised of:-- after "said".

UNITED STATES PATENT AND TRADEMARK OFFICE
CERTIFICATE OF CORRECTION

PATENT NO. : 4,689,183

DATED : August 25, 1987

INVENTOR(S) : Roger L. Helms and Stephen M. Harper

It is certified that error appears in the above-identified patent and that said Letters Patent is hereby corrected as shown below:

Col. 16, line 1, "adjcent" should read -- adjacent --.

Signed and Sealed this

Fifteenth Day of August, 1989

Attest:

DONALD J. QUIGG

Attesting Officer

Commissioner of Patents and Trademarks